No. 773,509. PATENTED OCT. 25, 1904.
C. LEISTNER.
MACHINE FOR THE MANUFACTURE OF GLASS BOTTLES OR THE LIKE.
APPLICATION FILED AUG. 11, 1904.
NO MODEL.
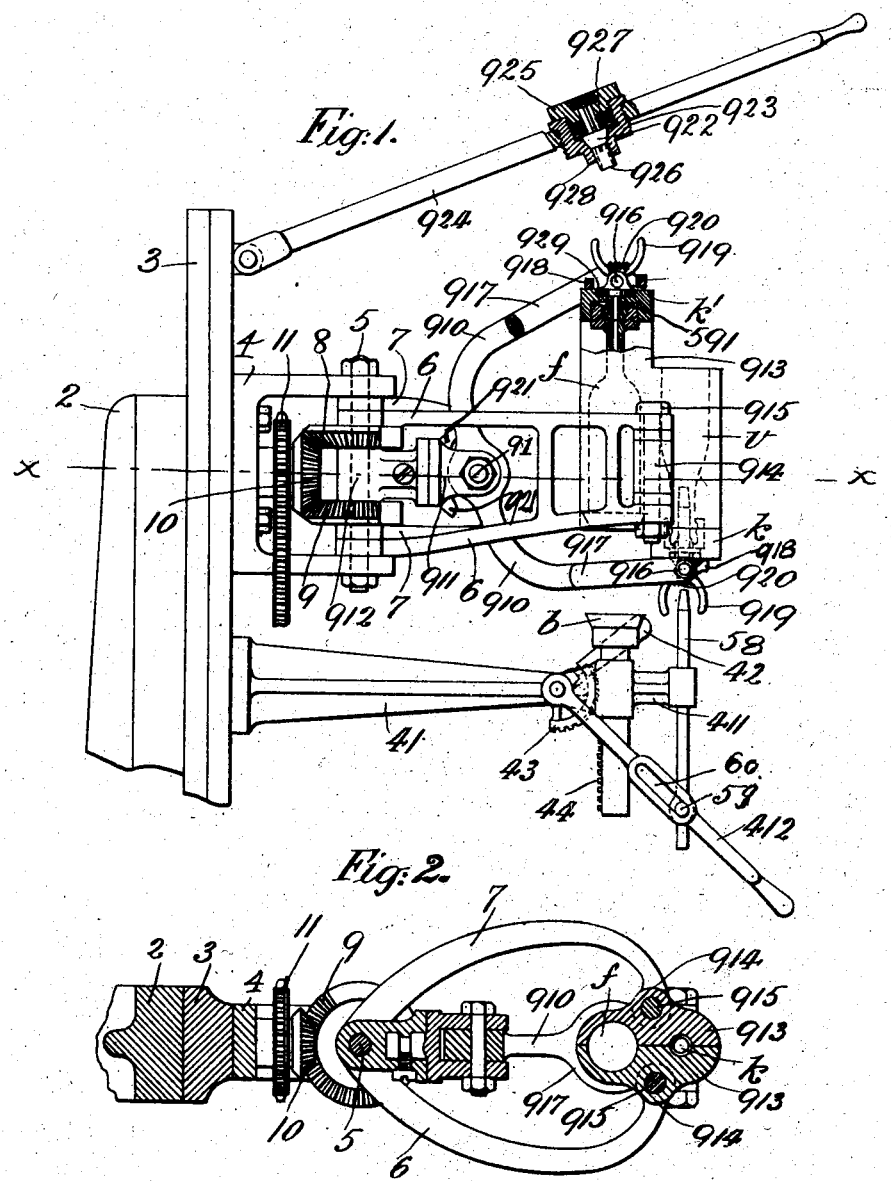
WITNESSES:
Frank Klein
Grace Ogle.
INVENTOR
Carl Leistner
by W. E. Evans
ATTORNEY No. 773,509.                                                    Patented October 25, 1904.

UNITED STATES PATENT OFFICE.

CARL LEISTNER, OF LONDON, ENGLAND.

MACHINE FOR THE MANUFACTURE OF GLASS BOTTLES OR THE LIKE.

SPECIFICATION forming part of Letters Patent No. 773,509, dated October 25, 1904.

Application filed August 11, 1904. Serial No. 220,418. (No model.)

*To all whom it may concern:*

Be it known that I, CARL LEISTNER, a subject of the German Emperor, residing at 100 The Avenue, Bruce Grove, Tottenham, London, England, have invented certain new and useful Improvements in and Relating to Machines for the Manufacture of Glass Bottles or the Like, of which the following is a specification.

This invention relates to machines for the manufacture of glass bottles and the like, and has for its object to provide a machine of simple and inexpensive construction having a relatively great capacity of production.

The invention relates to glass-bottle-blowing machines of the Leistner type, in which a parison is formed in the parison-mold simultaneously with the finishing of a bottle in the finishing-mold; and the invention broadly consists in the employment of two interchangeable neck-molds supported so as to be capable of conforming their axial positions to the position of the fixed parison and finishing molds, the axes of which are arranged parallel to each other instead of being in line. This broad idea is capable of realization in many constructional forms.

As illustrated in the accompanying drawings, the parison and finishing molds are formed side by side, but in relatively inverted positions in the same frame, so that on the closure of the molds a parison may be formed by the upward movement of a plunger in the one and a bottle formed and finished by blowing in the other. The two interchangeable neck-molds are provided, which are carried on or connected to pivoted arms carried by a rotatable frame, which is turned through one hundred and eighty degrees to bring the said neck-mold in turn into axial alinement with the parison-mold, while the other neck-mold is simultaneously placed in axial alinement with the finishing-mold, the parison formed at each operation of the machine being carried by one of said neck-molds into position to be clamped in the finishing-mold.

In the drawings, Figure 1 is a side elevation of one form of machine embodying my invention, showing certain parts in section; and Fig. 2 is a central sectional plan view through the mold-supporting bracket on the line *x x* of Fig. 1.

In the views, 2 represents the frame of the machine carrying the vertical member 3 for supporting the operative parts. Bolted to the front face of said member 3 is a bracket 4, having forwardly-projecting arms in which is journaled the vertical pivot-bolt 5 for the radial mold-supporting bracket composed of the arms 6 and 7. Journaled on the pivot-bolt 5 are two segmental bevel-gears 8 and 9, secured to said arms 6 and 7, respectively. Both gears 8 and 9 mesh with the bevel-gear 10, adapted to be driven by the sprocket wheel and chain 11 from any suitable source of power. When said gearing is set in motion in one direction, the arms 6 and 7 are swung outwardly away from each other, and when it is driven in the other direction said arms are approached. Each of said arms carries one-half of the parison-mold *v* and one-half of the finishing-mold *f*. Said half-molds are formed in castings 913 913, bolted at 915 to the ends of the arms 6 and 7, and the molds are inverted relatively to each other.

Projecting forwardly from the frame member 3 is a bracket 41, which serves as support for the bottom mold *b* and the plunger 58. The former of these is arranged in axial alinement with the finishing-mold *f*, and the latter is in axial alinement with the parison-mold *b*. The bottom mold *b* is carried by a shank having rack-teeth 44 formed thereon, and a gear-segment 43, pivotally mounted on the bracket 41, meshes with said rack-teeth. A handle 412, secured to the axis of said segment, serves to raise and lower the bottom mold into engagement with the lower end of the parison-mold, where it serves to support and shape the bottom of the parison during the operation of blowing. The plunger 58 is provided with a pin 59, which is engaged by a slot 60 in said handle 412, so that a single movement of the latter serves to elevate or depress both the bottom mold *b* and plunger 58. The latter forms the bottle-neck in the blank held in the parison-mold at the same time as the bottle is formed in the finishing-mold.

The neck-molds *k* and *k'* are each formed in halves pivotally carried at 916 on the forked extremities 917 917 of arms 910 910, integral with each other and pivoted at 91 on a rotatable bracket 911, journaled in a boss formed in the sleeve 912, surrounding the pivot-bolt. This bolt and sleeve remain stationary during the rotation of the gears 8 and 9 and of the arms 6 and 7, to which said gears are respectively secured.

The neck-molds can be opened by means of the hand-levers 919 and are normally kept closed by springs 920 in a manner well known in the art. Stops 918 may be provided on the arms 910 to gage the position of the neck-molds.

For the purpose of admitting air for blowing and finishing the bottle an air-valve 926 is provided with a casing 923, which is mounted upon a lever 924, attached to the frame member 3, and a cover 925 is provided for the said casing 923, to which connection can be made by a hose or other pipe for the supply of air to the valve-casing. The lower extremity of the valve 926 is hollow and is provided with holes through which when the valve is forced upwardly against the action of the spring 927 air passes from the valve-casing to the lower hollow part of the valve. It will thus be understood that on the lever 924 being brought down the lower hollow part of the air-valve 926 enters the neck-mold and engages the mouth-forming nipple 591, while the flange 928 of the casing 923 presses against a gasket 929, so as to form an air-tight joint. On uplifting the lever 924 it will be understood that the supply of air is immediately cut off.

The arms 910, carrying the neck-molds, can be rotated about the longitudinal pivot in vertical planes to bring either mold beneath or above the parison and finishing molds, and said arms can be rocked upon the transverse pivot 91 to aline said neck-mold with said parison-mold or with said finishing-mold, as the case may be, this latter movement being limited and gaged by the stops 921 921.

The operation will be readily apparent from the foregoing description and requires but a brief résumé.

To start the operation, a lump of glass is placed in the parison-mold and the plunger 58 is passed through the neck-mold to form the neck-aperture. The parison and finishing molds are then opened by the swinging apart of the arms 6 and 7 and the lower neck-mold with the partially-formed parison suspended therefrom is swung around into position in axial alinement with the finishing-mold. The molds are then closed again and another lump of glass being placed in the parison-mold the operation of plunging is repeated, while at the same time the air-valve 926 is brought down onto the neck-mold on the finishing-mold and the partially-formed parison therein is blown to a finished bottle, the bottom mold having been raised by the same movement which raised the plunger 58. Subsequently the molds are opened again, the finished bottle is removed, another blank is placed in the parison-mold, and the parison is carried into the finishing-mold.

The mechanism I have illustrated forms one embodiment of my invention, which, however, is capable of embodiment in other forms of mechanism—for example, the neck-mold-carrying frame 910 910 may be arranged to rotate in a horizontal instead of in a vertical plane, the finishing and parison molds being then also arranged in a horizontal plane, and obviously various other arrangements and means can be substituted for those shown without departing from the spirit of my invention. I do not wish, therefore, to be limited to the precise structure and arrangement shown.

What I desire to secure by Letters Patent of the United States, and what I claim, is—

1. In a machine of the class described, the combination of a parison and a finishing mold arranged in parallel relation but in inverted position, and a pair of neck-molds carried by a rotatable and swinging frame so that each neck-mold may be applied alternately to said parison and finishing molds.

2. In a machine of the class described, the combination of a pair of pivoted arms, complementary parts of parison and finishing molds carried by each arm in inverted position relatively to each other, means to swing said arms toward and away from each other, and a swinging frame carrying neck-molds adapted to be applied simultaneously to said first-mentioned molds.

3. In a machine of the class described, the combination of a parison and a finishing mold, means to open and close the same, a swinging frame carrying a pair of neck-molds, so that one neck-mold can be applied to said parison-mold while the other neck-mold is simultaneously applied to said finishing-mold, a plunger to enter the parison-mold, a bottom mold to engage the finishing-mold, means to simultaneously move said plunger and bottom mold into operative position, and means to pass air under pressure through one of the neck-molds into the finishing-mold.

4. In a machine of the class described, the combination of a frame, a pair of swinging arms coincidently pivoted thereon, inverted complementary parts of a parison-mold and a finishing-mold carried by each of said arms, gearing to swing said arms on their pivot to separate and close said complementary parts, a bifurcated member pivoted on said frame so as to rotate in a plane at right angles to the plane of swing of said arms, and also mounted to oscillate within limits in a plane at right angles to its plane of rotation, a neck-mold carried on each arm of said bifurcated member, whereby each neck-mold may in turn be brought into position to be applied to said parison-mold and then into position to be applied to said finishing-mold, a plunger to enter said parison-mold and means to convey air under pressure into said finishing-mold, whereby a parison and a finished bottle may be simultaneously formed at each operation of the machine.

In testimony whereof I have signed my name to this specification in the presence of two subscribing witnesses.

CARL LEISTNER.

Witnesses:
WILLIAM EDWARD EVANS,
RICHARD SIERAR.